United States Patent [19]

de Hoog et al.

[11] Patent Number: 4,900,915

[45] Date of Patent: Feb. 13, 1990

[54] METHOD OF COUNTING ARTICLES SUPPLIED ON A CONVEYOR TRACK IN A RANDOM PATTERN

[75] Inventors: Johannes H. de Hoog, Delft; André Deen, The Hague; Peter J. Wever, Leiderdorp, all of Netherlands

[73] Assignee: Heineken Technisch Beheer B.V., Amsterdam, Netherlands

[21] Appl. No.: 272,212

[22] Filed: Nov. 16, 1988

[30] Foreign Application Priority Data

Nov. 17, 1987 [NL] Netherlands .......................... 8702738

[51] Int. Cl.[4] .............................................. G01V 9/04

[52] U.S. Cl. .................................. 250/222.2; 250/560

[58] Field of Search .................... 250/560, 561, 223 R, 250/223 B, 222.2; 356/376, 384–387; 358/101, 107; 377/53

[56] References Cited

U.S. PATENT DOCUMENTS 4,490,617 12/1984 Loose .................................. 356/386

4,589,079 5/1986 Peter ................................ 250/222.2

*Primary Examiner*—David C. Nelms

*Attorney, Agent, or Firm*—Amster, Rothstein & Ebenstein

[57] ABSTRACT

A method of counting, in real time, articles supplied on a conveyor track in a random pattern is disclosed. The method comprises forming an image of the articles present in a counting zone by means of an image pick-up device, which counting zone corresponds to a periodic, elongated image of the image pick-up device, which image extends essentially transversely to the direction of movement of the conveyor track. The elongated image is converted into a binary image composed of a row of image elements, each with its own grey value, which binary image is obtained by assigning a first logic state to image elements having a grey value above a pre-determined threshold value and a second logic state to image elements below this threshold value. The invention is characterized by determining whether an article arrived in the counting zone, whether the article subsequently reaches a minimum width in the image, and whether the article leaves the counting zone again, whereby a count signal is produced when the article leaves the counting zone.

7 Claims, 2 Drawing Sheets

METHOD OF COUNTING ARTICLES SUPPLIED ON A CONVEYOR TRACK IN A RANDOM PATTERN

This invention relates to a method of counting, in real time, articles supplied on a conveyor track in a random pattern.

A prior method of this kind, disclosed in Netherlands patent application 7808465, comprises forming an image of the articles present in a counting zone by means of an image pick-up device, said counting zone corresponding to a periodic, elongated image of the image pick-up device, said image extending essentially transversely to the direction of movement of the conveyor track, converting said elongated image into a binary image composed of a row of image elements, each with its own grey value, which binary image is obtained by assigning a first logic state to image elements having a grey value above a pre-determined threshold value and a second logic state to image elements below said threshold value.

This known method relates to the counting of fruit and is based on recognizing a pre-determined specific pattern in two successive image lines. One disadvantage of the prior method is that errors in the counting result will occur when the articles move obliquely through the counting zone, because, as a result of the oblique movement, the pre-determined pattern, and hence a count can occur when this is not an indication of the actual departure of a fruit from the counting zone. Also, the prior method is only applicable when the articles to be counted have reflective surface portions surrounded by other surface portions having a considerably lower reflectivity, as is the case with spherical articles, because only then would it be ensured that articles located in contact with each other are counted separately rather than as one unit.

European patent application 0190090 describes a conveyor system, specifically a so-called pressure-less inliner, i.e. a conveyor for bottles or generally containers, supplied in a random pattern side by side over a broad transport zone, and which disordered collection must be transformed into a single row, preferably a compact one. In order that the transformation from the disordered collection to the single row be as efficient as possible, it is proposed in the publication referred to count the disordered containers and the containers in the single row, thereby to match the velocity of the conveyor track or tracks in the broad transport zone to that of the single transport track in an optimum manner. The publication describes that the disordered containers can be counted by means of pattern recognition techniques, in particular the recognition of the specific shape of the containers by means of a camera disposed above the counting area. Such a method only operates well, however, if the belt velocity is constant, because only then would the recorded shape of the container always be the same. With non-constant belt velocities, the image of the container viewed by the camera varies, so that the detection and hence the counting become unreliable. The publication also describes that the number of containers can be counted by determining in the counting zone the degree of occupation, that is to say, the ratio between the surface area occupied by the containers and the total surface area of the counting zone. However, that method also depends upon the velocity of the conveyor track.

The disadvantage of this known method is, therefore, that both of the techniques proposed for counting the number of containers supplied in a random pattern on a conveyor track are dependent upon the velocity of that conveyor track, while for an optimal control of the conveyor system of which the track formed part, the velocity of that track should exactly be variable. All this leads to incompactible conditions and hence to either an unreliable count of the disordered containers, or a suboptimal control of the conveyor system.

It is an object of the present invention to provide a method of counting, in real time, articles supplied on a conveyor track in a random pattern, specifically containers, which method is completely independent of the shape of the articles, of the velocity of the conveyor track, and is also insensitive to noise, and gives a reliable counting result even in case an article moves obliquely to the counting area.

To this effect, the invention provides a method of the above kind, which is characterized by determining whether an article arrives in said counting zone, whether the article subsequently reaches a minimum width in the image, and whether the articles leave the counting zone again, whereby a count signal is produced when the article leaves the counting zone.

The invention is based upon the insight that the unambiguous counting of articles on a conveyor track, assuming that all articles have the same shape, is possible by means of a method in which it is detected when an article enters a linear counting zone, in which the counting system is brought from a first (inoperative) condition into a second activated condition, in which second condition the counting system remains so long as the article remains present in the counting zone, and wherein the counting system produces a count pulse and returns to the first condition as soon as the article leaves the counting zone. In addition, it is checked whether the article reaches a minimum width in the image to prevent that spurious signals lead to an erroneous count. The counting method according to the invention is applicable to any number of articles present in side-by-side relationship on the belt in the counting zone.

An image can be formed from the elongated counting zone by means of a line scanner, but the image is preferably obtained by selecting a single image line from a 2-dimensional image formed from the counting zone by a camera. The use of a one-dimensional image has the advantage of having a short processing time, because the amount of information in an image line is considerably smaller than the information of the entire image viewed by the camera, as is used in the prior method, so that the counting results can be available extremely fast in the method according to the present invention.

According to a preferred embodiment, periodically a new image line is selected on the ground of pre-determined detection criteria.

One embodiment of the invention will now be described in more detail with reference to the accompanying drawings, in which.

Figure 1:
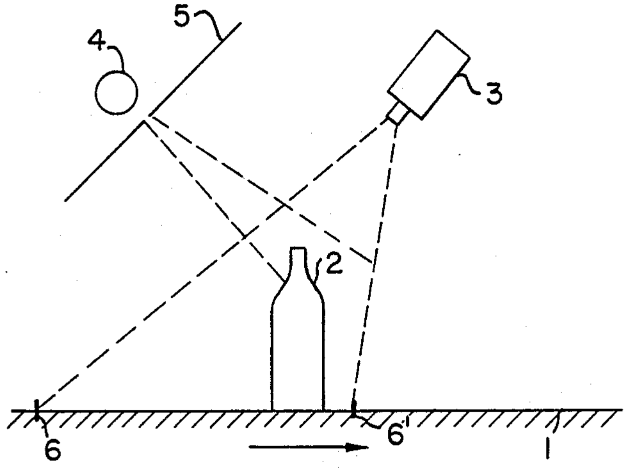
FIG. 1 shows a diagrammatic side-elevational view of an apparatus for carrying at the method according to the invention.

FIG. 1 diagrammatically shows a conveyor track 1 with a bottle 2 thereon, and above the conveyor track on one side a camera 3 and on the other a light source 4, which by means of a diaphragm 5, provides for illumination of a counting zone, which for reasons to be explained hereinafter is a linear illumination, and which counting zone corresponds to the viewing area of the camera 3, defined by points 6, 6' on the conveyor track 1.

Camera 3 is disposed above the conveyor belt, because a position aside of the belt is not useful. In fact, bottles standing next to each other in line with the optical axis of the camera are then counted as one bottle only. Preferably, a linear light source 1 is used, because in the first place only an elongated zone, more specifically one image line of the image of camera 3 is used for the counting, so that a uniform illumination of the area in which this image line is located is sufficient, and because in the second place the areas where reflected light can lead to spurious effects, in particular reflections from the surface of the conveyor belt, should preferably receive as small an amount of light as possible.

The camera 3 detects the light reflected by the top of bottle 2 and, depending on the type of container to be counted, i.e. bottles, with or without a crown cork, or tins, with or without a cover, or other articles with a light-reflecting top or top edge, the optimum position of the light source and the camera relative to each other and relative to the conveyor belt can in practice be determined so that the tops of the articles to be counted reflect as much light as possible and the sides of the articles and the areas of the conveyor belt surrounding the article reflect as little light as possible. Thus, in the case of bottles with a crown cork, an illumination at an angle relative to the longitudinal axis of the bottle has been found to be optimal, whereas in the case of empty tins an illumination in line with the longitudinal axis of the tins has been found to be optimal to have the upper rim of the tin reflect as much light as possible.

The image of, for example, a number of bottles on the conveyor belt, obtained by means of camera 3, can be processed by means of well-known image processing techniques, such as "opening" and "closing" to obtain optimum separation of the individual reflecting tops of the bottles and suppress "noise" as much as possible. Such image processing techniques are well known and will not therefore be discussed in any more detail herein.

The image obtained by means of camera 3 and optimized by means of image processing techniques, which image is composed of grey values, is segmented by selecting a threshold value δ for the grey values, in order that the image of grey values may be converted into a binary image, applying the following formulas to the image elements f δ (i) of the binary image:

$$f\delta(i) = \begin{cases} 1, \text{ if } f(i) \geqq \delta \\ 0, \text{ if } f(i) < \delta \end{cases}$$

The image elements in the binary image which are representative of an article are represented by a "1" and the image elements representative of the background by a "0".

For selecting an optimum threshold value in the grey-values image, preferably an adapted method is used, in which the threshold value is optimized depending on prevalent conditions. In this way the effect of a variable amount of ambient light or of a decrease in light output from light source 1 can be compensated for. For the selection of the optimum threshold value, a number of methods are known, such as the method of Ridler and Calvard, the peak method and the alternative threshold-selection method. The specific characteristics of each of these methods are well known to those skilled in the art and will not therefore be described in any detail herein. Moreover, it will depend on the specific conditions in which counting is effected which method will be preferred, so that this will have to be determined experimentally.

Characteristic of a correct selection of the threshold value is that two image elements of the article located next to each other in the image must not belong to two articles and that a specific image element in two successive images must not belong to two articles.

The advantage of segmenting the grey-values image in a binary image is that the counting system can operate considerably faster because the images to be processed only consist of "ones" and "noughts". Moreover, in this way the effect of noise is substantially suppressed.

Figure 2:
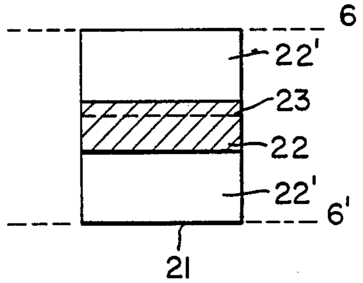
FIG. 2 is a schematic representation of the image obtained by means of the camera from the apparatus shown in FIG. 1.

In the image 21 of camera 3, shown in FIG. 2, an image line 23 is selected experimentally, which is representative of the counting information to be derived. This can be a fixed image line, but it is also possible, by means of an algorithm, to select the image line having the maximum sum of grey values. We will revert to this later.

Figure 3:
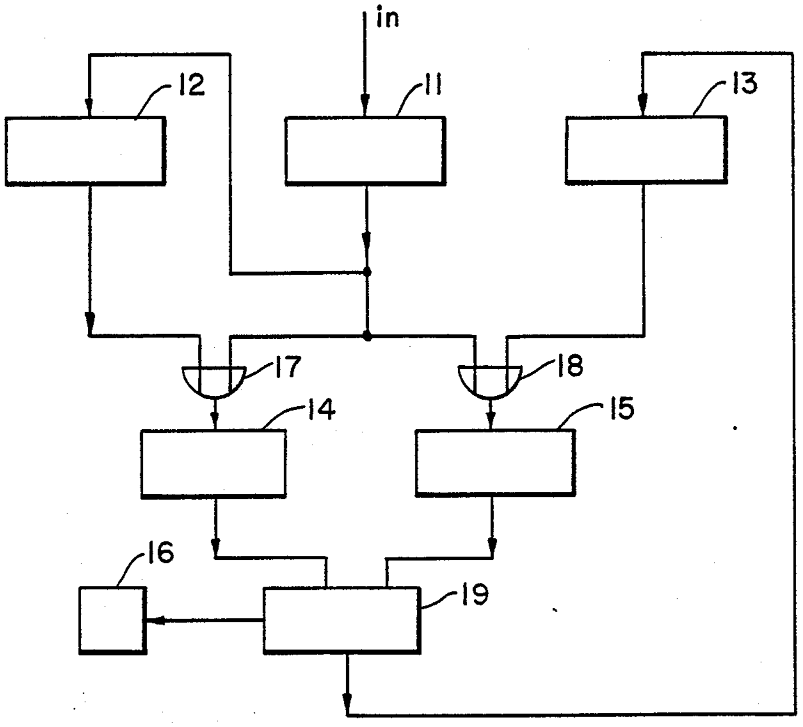
FIG. 3 is a block diagram illustrating the set-up of the counting system according to the invention.

FIG. 3 diagrammatically shows a possible set-up of a counting system for counting the individual articles in a randomly supplied mass. This counting system aims to memorize in what positions on an image line, hereinafter referred to as the image elements, an article has been present. The system must additionally memorize this until the article has passed the counting zone. When the articles are separated from each other, this means that, by means of a memory, the maximum width of the article up to a given moment can be determined. According to the invention, an article has passed when, of all image elements of an article, in the last two images not a single image element is of the article class. As soon as it has been detected that an article has passed and has been larger than a minimum width, the count value is increased and the elements of the article in the memory are erased.

As shown by FIG. 3, the counting system comprises five line buffers and a plurality of circuits for logic operations. In this arrangement:

- line buffer 11 contains the newly-segmented and preprocessed image at time t=nT; n=0,1,2 . . . line buffer 12 contains the previous image of time (n−1)T;
- line buffer 13 contains the recent history of the images; line buffer 14 contains the logic OR operation of the contents of buffer circuits 1 and 2; and
- line buffer 15 contains the logic OR operation of the contents of buffer circuits 11 and 12.

An image element of the article class has a logic value of "1", and an image element of the background class has a logic value of "0".

The operation of the system is as follows. The binary image at time t=nT, with n=0,1,2 . . . , is placed in line buffer 11. Line buffer 12 contains the information about the binary image at time (n−1)T. On the contents of line buffer 12 and line buffer 11, a logic OR operation is performed in OR gate 17, and the result is supplied to line buffer 14. Line buffer 14 then contains the information about image element as to whether it has belonged to the article class in at least one of the last two images.

Also, a logic OR operation is performed in OR gate 18 on the contents of line buffers 11 and 13. The result of this operation is supplied to line buffer 15. Line buffer 13 contains information indicating which image elements have belonged to the article class in the past. In this connection it should be noted that an image point of the article class need not always have belonged to an article, but may be the result of noise.

Accordingly, in this manner the counting system is able to determine the situation of the last two images and of the entire past. By means of this information it can be determined in a logic circuit 19 whether an article has indeed passed. In fact, an article is defined as the number of white points ("ones") in a line buffer which are interconnected. It is now determined by means of the logic operation in circuit 19 whether an article has passed.

The operation of the logic circuit 19 can be described as follows: The contents of line buffer 15 are compared to those of line buffer 14. When none of the points of an article from line buffer 14 has been detected as an element of the article class in line buffer 14, this means that, in the past, a number of successive image elements have been detected as image elements of an article, but that in the last two images no corresponding image elements have been detected as article elements, so that it can be assumed that the article has passed. The information about this article is then no longer placed in line buffer 13, but, instead, the contents of a counter 16 are increased by 1. The other information about image elements of the article lass is placed in line buffer 13, because this is information about the image elements of the article class which may belong to an article that has not yet passed.

It is noted that, if the image information is processed in the circuit of FIG. 3 image-element-wise, and if the electronic circuits used are fast enough, line buffers 11, 14 and 15 can be done without.

To ensure that the movements of the articles perpendicular to the direction of movement of the conveyor belt do not give erroneous counting results, preferably the maximum width of an article is taken into account. It can thus be achieved that, in line buffer 13, an article cannot become broader than a pre-determined value. When an article in line buffer 15 has a larger width, image points of the article class on opposite sides of the article are removed until the width of the article equals the maximum width. The maximum difference between the number of image elements removed on opposite sides is 1. By means of this correction, an article with a displacement perpendicular to the direction of transport can, so to say, be followed in line buffer 13.

To further explain the operation of the system according to the invention, an example will be described with reference to FIGS. 4*a–e*. It is assumed there are 10 image lines produced by camera 3 of FIG. 1 at the successive times t=0 to t=9T, each line being composed of 10 image elements. It is also assumed that the image lines are already segmented and have possibly been subjected to further image processing techniques, to produce a suitable binary image. In the figures, the image elements representing an article are shown in white, and represent a logic "1", whereas the image elements indicating the position where no article is detected by the camera are black and represent a logic "0".

FIG. 4*a* shows the 10 image lines supplied at the successive times t to line buffer 11. FIG. 4*b* shows the contents of line buffer 12 at the successive times; FIG. 4*c* those of line buffer 13; FIG. 4*d* those of line buffer 14, i.e. the result of the logic OR operation on the contents of buffers 11 and 12; and FIG. 4*e* the contents of line buffer 15, i.e., the result of the logic OR operation on the contents of buffers 11 and 13.

In the logic circuit 19, the contents of line buffers 14 and 15 are compared with each other. The white line pieces from line buffer 15 which in line buffer 14 have no corresponding white points are removed, because this means that an article has disappeared. When a line piece is removed, the contents of counter 16 will be increased by 1. The contents of the counter are shown next to FIG. 4*e*. The resulting image after the removal of the line pieces is placed in line buffer 13 and represents the recent past of the image elements.

The system operates in two stages, namely, at times $t=T+nT$ $(n=0,1,2\ldots)$ and at times $t=T+(n+\frac{1}{2})T$ $(n=0,1,2\ldots)$. At the first point of time, the contents of line buffers 11, 12 and 13 are processed, resulting in fresh values in line buffers 14 and 15. These fresh values are subsequently processed, resulting in new contents for line buffer 13 and possibly an increase of the contents of counter 16.

Figure 4:
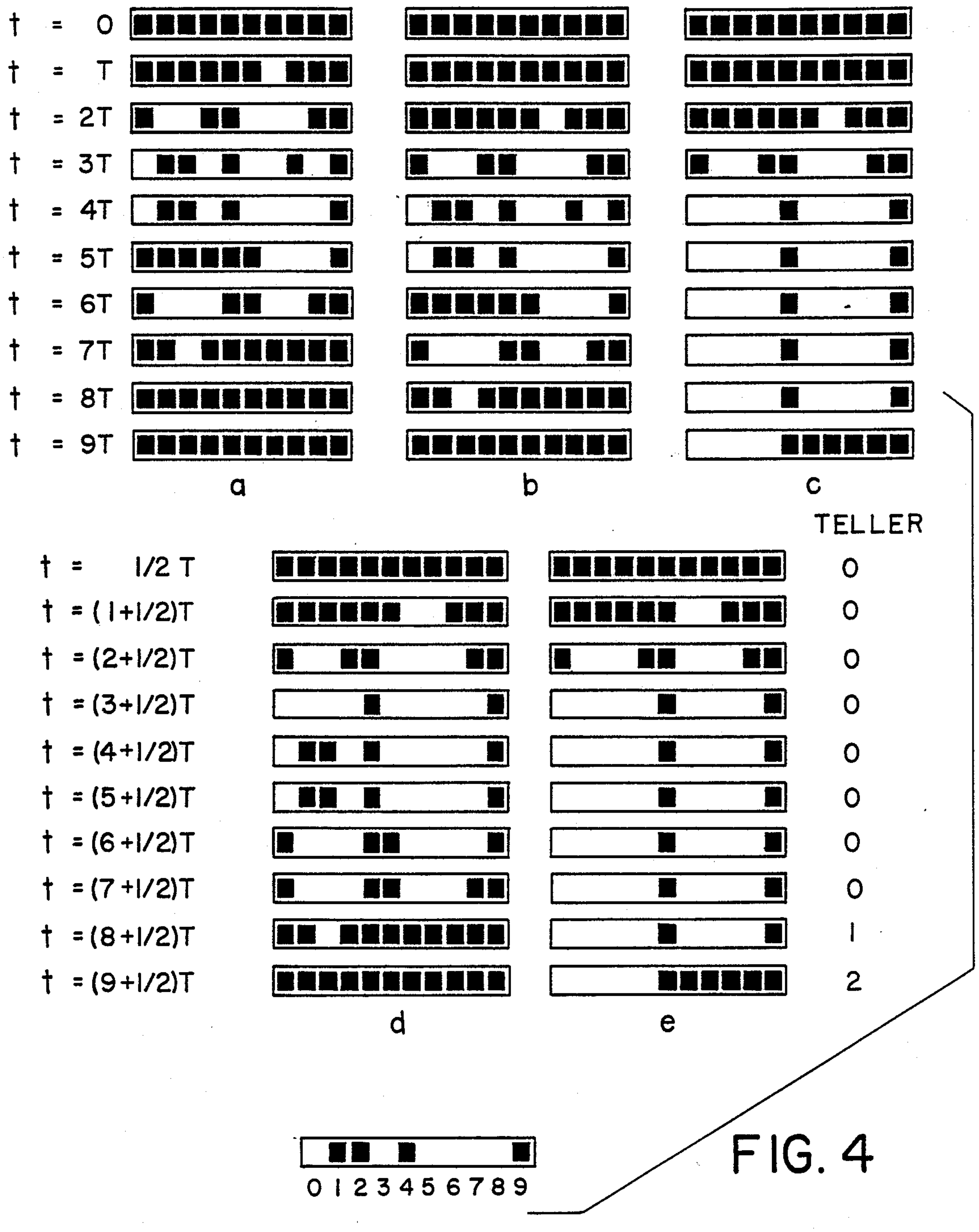
FIGS. 4a, 4b, 4c, 4d and 4e illustrate an example of counting containers by means of the apparatus illustrated in FIG. 4.

The counting system shown in FIG. 3 and as elucidated with reference to FIG. 4, can operate image-element-wise, i.e. so that the image elements are processed one after the other, which generally is rather a time-consuming procedure. In fact, the processing of an image composed of $1\times N$ image elements requires 4N operations to be carried out, namely, the logic OR operations in circuits 17 and 18, the logic operation in circuit 19, and copying the contents of buffer 11 to buffer 12. These are only the number of operations without the segmentation and the pre-processing steps. Especially in the case of large images, this large number of operations may be disadvantageous, because it makes the counting system too slow.

Figure 5:
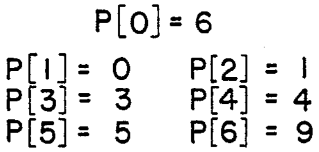
FIG. 5 is a schematic representation of a so-called run table.

Preferably, therefore, use is made of run tables, by virtue of which the number of operations can be decreased. This known per se technique for processing binary images reduces the number of operations by processing the image in coded form. In a run table $P(n)_2$, only the start and stop positions of the runs are contained, as shown schematically in FIG. 5. In this context, a run is a succession of image elements with the same value. Consequently, there are runs of consecutive points of the article class (white, "1") and runs of consecutive points of the background class (black, "0"). On such run tables, all binary operations can be carried out.

When the number of transitions of the articles is small relative to the number of image points, the use of run tables is attractive. The processing time of the run code depends on the length of the table. When, in practice, for example, 12 articles are next to each other on the track, this means an image comprising 12 transitions from the background class to the article class and 12 transitions the other way round. In the ideal case, no more than 24 transitions will be contained in the run table. From this it also follows that the number of transitions does not depend on the resolution. With run tables, the processing time only depends on the number of objects passing. When, in the line buffers, element by element is processed, the processing time depends upon the number of elements in the line buffers. When the resolution in the line buffers is increased, so the number of operations will increase, whereas the number of operations with run tables will remain constant. Therefore the processing speed of an image is known when processed per element, and variable when run tables are used, because in that case it depends upon the number of objects passing the camera. When, for example, an image line with 416 image points is used, while no more than 12 articles can be present on an image line, the use of run tables can reduce the number of elements to be processed per image line from 416 to 24, i.e. the maximum number of transitions.

As indicated hereinbefore, preferably the image line with the maximum sum of grey values is selected from the camera image. Thus the image line is determined which contains the most reflection information of the passing articles. Although such an image line can be determined experimentally for a given type of articles being transported over the conveyor track, it is preferred that the image line with the maximum sum of grey values is periodically determined automatically. In order to avoid that, as a result of an erroneous measurement, a completely wrong image line is selected, the image line number is preferably defined by the following formula:

$$\text{image line no.}_{new} = \frac{\text{image line no.}_{old} + \text{image line no.}_{measured}}{2}$$

The determination of the new image line number is continued until:

image line $\text{number}_{new} = \text{image line number}_{old}$

In this way, not only is always the optimum image line selected during the measurement of articles of one given type, but also the image line is automatically adapted in the case of articles with a different height. When the counting apparatus is used, for example, in a bottling arrangement, this has the advantage that when there is a change in type of bottle or type of tin, the counting apparatus need not to be re-adjusted.

FIG. 2 diagrammatically shows at reference numeral 21 the total image area of the image viewed by camera 3 in the arrangement of FIG. 1. The hatched portion 22 in FIG. 2 is the area with permitted image lines whose image line numbers may be taken into consideration in determining the image line with the maximum sum of grey values. This is the area within which, with any given type of articles being transported, an image line with reflection values can be found when an article is in the viewing area of the camera. The areas 22' in FIG. 2, however, contain the image lines containing information about the amount of light reflected by the background, i.e. the conveyor belt. When, during the summing of grey values no articles pass the camera, the image line with the maximum sum of grey values found will always be one falling outside the collection 22 of permitted image lines. As this image line is located outside the image lines permitted, however, this measurement has no effect on the determination of the new number of the image line.

When the above method of selecting the image line with the maximum sum of grey values is used, the sum of grey values may, if desired, be determined with regard to a plurality of images rather than one. This reduces the risk of a poor measurement even further.

If use is made of a conveyor with which always the same articles are transported with the same height, the same image line will in principle always contain the optimum information and, if desired, instead of a camera giving a 2-dimensional image, use can be made of a line scanner which gives a linear image of the linear area of the article reflecting an optimum amount of light.

The method according to the invention has been found to be able to count containers supplied on a conveyor track at a variable velocity in a highly reliable manner. Thus practice has shown that a counting error of less than 0.5% can be reached with facility.

I claim:

1. A method of counting, in real time, articles supplied on a conveyor track in a random pattern, which comprises forming an image of the articles present in a counting zone by means of an image pick-up device, said counting zone corresponding to a periodic, elongated image of the image pick-up device, said image extending essentially transversely to the direction of movement of the conveyor track, converting said elongated image into a binary image composed of a row of image elements, each with its own grey value, which binary image is obtained by assigning a first logic state to image elements having a grey value above a predetermined threshold value and a second logic state to image elements below said threshold value, characterized by determining whether an article arrives in said counting zone, whether the article subsequently reaches a minimum width in the image, and whether the article leaves the counting zone again, whereby a count signal is produced when the article leaves the counting zone.

2. A method as claimed in claim 1, characterized by determining with a first logic operation which corresponding image elements of the first logic state are contained in the instantaneous binary image and the preceding binary image, determining with a second logic operation which corresponding image elements of the first logic state are contained, on the one hand, in the preceding binary images and, on the other, in the instantaneous binary image, and then determining which row or rows of successive image elements of the first logic state determined with the second logic operation does not contain corresponding image elements of a first logic state in the series of image elements determined with the first logic operation, and removing such row or rows from the series of image elements determined with the second logic operation, whereby a count signal is generated, corresponding with the number of rows removed.

3. A method as claimed in claim 2, characterized in that the binary image composed of image elements is coded in the form of run tables.

4. A method as claimed in claim 2 or 3, characterized in that the result of the second logic operation is corrected to limit the length of a row of successive image elements of the first logic state to a pre-determined number of image elements related to the maximum width of an article to be counted.

5. A method as claimed in claim 1, in which the periodic elongated image is an image line of a 2-dimensional image, formed with a television camera, of a portion of the conveyor track along which the articles to be counted pass, characterized by periodically determining the image line in which the sum of the grey values is greater than the sum of the grey values of each of the other image line.

6. A method as claimed in claim 5, in which the image lines are numbered consecutively, characterized by periodically selecting a new image line in accordance with the formula $$\text{image line no.}_{new} = \frac{\text{image line no.}_{old} + \text{image line no.}_{measured}}{2}$$

where image line $\text{number}_{old}$=number of the image line during the previous measurement image line $\text{no.}_{measured}$=the number of the image line with the instantaneous maximum sum of grey values image line $\text{number}_{new}$=the number of the image line during the next measurement.

7. A method as claimed in claim 6, characterized in that image lines representative of the elongated image can only be selected from a pre-determined part of the 2-dimensional image.

* * * * *